No. 760,578. PATENTED MAY 24, 1904.
C. P. STEINMETZ.
TOOTHPICK HOLDER.
APPLICATION FILED JAN. 14, 1904.
NO MODEL.
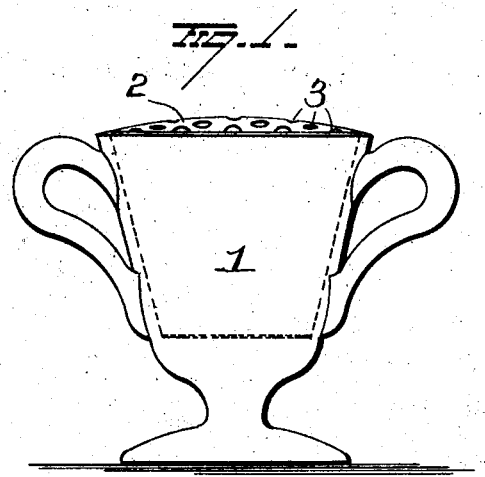
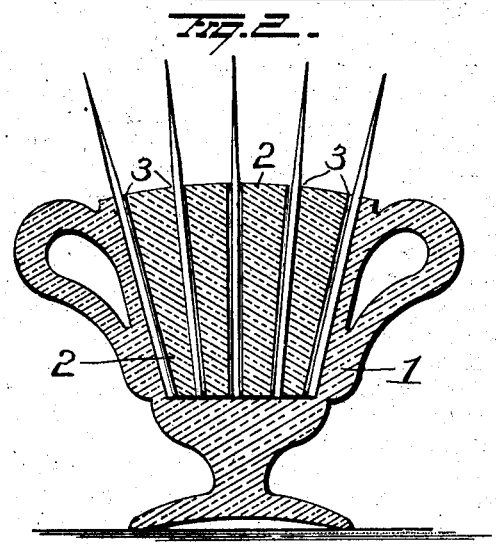
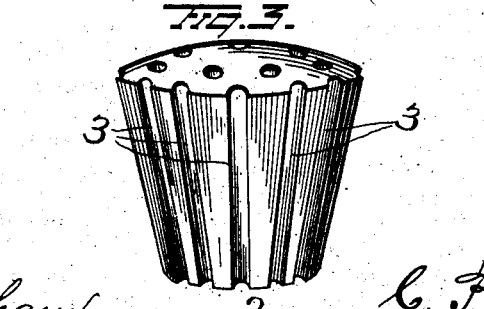
WITNESSES
E. J. Nottingham
G. F. Downing
INVENTOR
C. P. Steinmetz
By H. A. Seymour
Attorney No. 760,578. Patented May 24, 1904.

UNITED STATES PATENT OFFICE.

CONRAD P. STEINMETZ, OF MITCHELL, SOUTH DAKOTA.

TOOTHPICK-HOLDER.

SPECIFICATION forming part of Letters Patent No. 760,578, dated May 24, 1904.

Application filed January 14, 1904. Serial No. 189,041. (No model.)

*To all whom it may concern:*

Be it known that I, CONRAD P. STEINMETZ, a resident of Mitchell, in the county of Davison and State of South Dakota, have invented certain new and useful Improvements in Toothpick-Holders; and I do hereby declare the following to be a full, clear, and exact description of the invention, such as will enable others skilled in the art to which it appertains to make and use the same.

My invention relates to an improved toothpick-holder, the object of the invention being to provide a neat and attractive article of this character which will hold the toothpicks in such formation as to enable a person to readily remove one without contact with the others, which can be readily charged with toothpicks when empty, which can be easily cleaned or a broken toothpick removed, and which will be extremely ornamental as well as useful.

With this object in view the invention consists in certain novel features of construction and combinations and arrangements of parts, as will be more fully hereinafter described, and pointed out in the claims.

In the accompanying drawings, Figure 1 is a perspective view illustrating my improvements. Fig. 2 is a view in longitudinal section, and Fig. 3 is a view of the removable body.

1 represents a cup or holder of the design shown or other ornamental shape having a conical pocket or receptacle in its top to receive a similarly-shaped removable body 2, made with a curved or rounded upper face. This body 2 is provided around its circumference with a series of longitudinal grooves 3, and the inner face of cup or holder 1 coöperates with these grooves to hold toothpicks in flared formation at the top of the holder and each toothpick spaced apart. The body 2 is also made with a series of vertical openings extending through the same, in all of which toothpicks are to be held, and said openings are so located as to hold the toothpicks properly spaced to be readily grasped and easily removed.

Both the cup or holder 1 and body 2 are preferably composed of glass, although they may be made of earthenware, metal, or other material, and it will be seen that by constructing my improvements as above described the body 2 can be readily removed to clean the holder or to remove broken toothpicks and that the device is sanitary in that it prevents persons from handling any save the toothpick they remove.

Of course the holder might be used for other articles than toothpicks; but it is especially adapted for holding the same, and slight changes might be made in the general form and arrangement of the parts described without departing from my invention, and hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. A toothpick-holder, comprising a cup and a conical body therein, said conical body having longitudinal peripheral grooves for the reception of toothpicks.

2. A toothpick-holder, comprising a cup and a conical body fitting therein and having radiating sockets for the reception of toothpicks.

3. A holder, comprising a cup having a conical pocket therein, a removable conical body in said cup and having longitudinal grooves around its periphery.

4. A toothpick-holder, comprising a conical cup or holder, a removable conical body in said cup and having a rounded upper end, and said body having openings therethrough and longitudinal grooves in its periphery to hold toothpicks spaced apart and conveniently located for removal.

In testimony whereof I have signed this specification in the presence of two subscribing witnesses.

CONRAD P. STEINMETZ.

Witnesses:
L. M. RUSS,
R. G. TOWNSEND.